United States Patent [19]

Crisman et al.

[11] 4,447,332

[45] May 8, 1984

[54] FUEL SLUDGE TREATMENT METHOD, ESPECIALLY FOR LEADED GASOLINE STORAGE TANK SLUDGE

[75] Inventors: Robert W. Crisman, Hamilton; Dominick DeAngelis, Trenton, both of N.J.

[73] Assignee: Mobil Oil Corporation, New York, N.Y.

[21] Appl. No.: 478,823

[22] Filed: Mar. 25, 1983

[51] Int. Cl.³ .............................................. B01D 35/14
[52] U.S. Cl. ................................... 210/748; 210/771; 210/807; 210/290; 210/909
[58] Field of Search ................. 34/93; 220/88 A, 371, 220/372; 422/184, 186; 210/265, 274, 281, 283, 290, 291, 436, 472, 271, 627, 748, 768, 770, 771, 807, 909, 912

[56] References Cited

U.S. PATENT DOCUMENTS

| | | | |
|---|---|---|---|
| 2,279,848 | 4/1942 | Unger, Jr. ......................... | 34/93 X |
| 3,682,307 | 8/1972 | Cook et al. ....................... | 210/265 X |
| 3,835,021 | 9/1974 | Lorenz et al. .................... | 210/774 X |
| 4,249,317 | 2/1981 | Murdock ........................... | 34/93 |
| 4,260,426 | 4/1981 | Werfelman ....................... | 210/283 X |
| 4,260,489 | 4/1981 | Greig et al. ....................... | 210/771 |
| 4,328,901 | 5/1982 | Gunderman et al. ............ | 220/88 A |
| 4,382,863 | 5/1983 | Riise ................................. | 210/271 X |

FOREIGN PATENT DOCUMENTS 1340931 12/1973 United Kingdom .

*Primary Examiner*—Benoit Castel
*Assistant Examiner*—W. Gary Jones
*Attorney, Agent, or Firm*—A. J. McKillop; M. G. Gilman; L. G. Wise

[57] ABSTRACT

A sludge treatment technique adapted for separating volatile liquid hydrocarbons and/or water from sludge solids in a horizontal enclosed tank having a supported bed of filter particles. Liquids are permitted to drain and evaporate under controlled conditions and a removable top closure permits exposure of sludge solids to ambient U-V radiation and weathering conditions whereby lead-containing sludge is detoxified to environmentally acceptable levels.

5 Claims, 4 Drawing Figures

FUEL SLUDGE TREATMENT METHOD, ESPECIALLY FOR LEADED GASOLINE STORAGE TANK SLUDGE

FIELD OF INVENTION

This invention relates to sludge treatment method for recovering detoxified sludge solids from hydrocarbon materials, such as gasoline storage tank sludge. In particular, it relates to a photodegradation technique useful for rendering lead-containing sludge non-hazardous.

BACKGROUND OF THE INVENTION

In petroleum refining and storage facilities quantities of hydrocarbon-laden sludge or waste collects in processing equipment or tanks and must be removed periodically as part of routine plant maintenance. Common sources of sludge in the petroleum industry include fuel storage tanks, handling equipment, contaminated bottoms from separators, residue from catalytic processes, spent clays and acids, emulsified liquid-solid materials, sludge from decanting operations, and the like. In the storage of liquid fuels, such as leaded gasoline, various reactions or physical conditions may cause precipitation of hazardous solids to the bottom of storage tanks. Although the precise causes of sludge formation are not completely understood, oxidation, moisture condensation and the like may contribute to formation of a layer of lead-containing material which is removed from the collection point, often by scraping and washing with water and/or cleaning compositions.

Handling of solid refinery waste materials is a difficult problem due to numerous factors such as the diversity of waste, contamination of wastes with oil, water, solvents, etc. The high capital and operating costs of treatment and disposal make such processes expensive. Because of the need for environmental improvement, however, it is necessary that waste treatments and controls be included in manufacturing and industrial processing and there is an obvious need for improved waste disposal techniques. A particular problem within the petroleum industry with respect to the handling of wastes has been the separation and disposal of solid waste materials. In many instances oil containing solids must be separated from oil containing liquids (e.g., emulsions of oil in water and water in oil) and after such separation, the oil containing liquids are difficult to dispose without pollution or they must be specially treated to separate and recover oil therefrom.

It is known in the art that refinery oil sludge materials may be subjected to the action of soil bacteria whereby the oil is decomposed over a period of time. The use of a sand filter to separate oily particles from aqueous emulsion is disclosed in British Pat. No. 1 340 931. In U.S. Pat. No. 3,835,021 (Lorenz et al) a process is disclosed for dewatering and deoiling refinery sludges in a filter press and applying the solid filter cake to soil for biodegradation. In the 1975 American Petroleum Institute "Guide for Controlling Lead Hazard Associated with Tank Entry and Cleaning" sludge disposal by dumping in an exposed pit, ground or concrete surface is discussed. However, the prior disposal procedures are unacceptable for adequate treatment of hazardous wastes, such as hydrocarbon-laden, lead-containing sludge materials. In some prior disposal processes the sludge materials from the refinery were taken directly to a land receptacle and worked into the soil. Where oil was recovered from the sludge materials, the technique used was to bring the oily sludge and emulsions from the refinery to the land area by vacuum truck and discharge them into an enclosed area where they were allowed to spread to a depth of about 6 inches. After settling, the oil which separated to the top was recovered by the vacuum truck for return to the refinery and the remaining sludge was mixed with soil by bulldozer. Such a technique is not only very inefficient with respect to oil recovery, but also actually contributes to pollution because run-off waters from rain on the raw sludge carry away oil and cause oil contamination of streams.

Other sludge filtering techniques are disclosed in U.S. Pat. No. 4,260,489 (Greig et al) wherein the filtration residue is further treated by solvent extraction and/or steam stripping.

Alternatively, the sludge materials may be removed from the refinery site for environmentally safe disposal at approved location; however, this can be a costly procedure and may only defer the detoxification problem. A need exists for on-site treatment of such sludge materials and it is an object of the present invention to provide equipment and processes for recovering and detoxifying hazardous sludge materials.

SUMMARY OF THE INVENTION

It has been found that refinery sludges containing volatile hydrocarbons mixed with solids and/or an aqueous phase may be treated in an enclosed treatment tank having a horizontally disposed bed of inert filtering particles, such as sand/gravel, to remove the liquid components. Following separation of liquid and evaporation of volatile components under controlled conditions, the remaining sludge solids may be further treated in situ by photodegradation.

A preferred method for treating lead-containing sludge from liquid petroleum product storage sites comprising the sequential steps of (a) transporting a solid-liquid sludge mixture containing volatile liquid hydrocarbons, sludge solids and water to an enclosed outdoor filter tank having a removable top cover; (b) applying the sludge mixture uniformly over a horizontal bed of supported inert filter particles; (c) draining liquid from the sludge mixture through the filter particles to deposit a layer of wet sludge solids onto the filter particles; (d) permitting residual sludge liquids to evaporate in the enclosed filter tank by introducing controlled air flow and withdrawing hydrocarbon vapors through a flame arrestor outlet vent; (e) removing the top cover to expose sludge solids to ambient ultraviolet radiation and weathering conditions for photo-degradation of the sludge solids; and (f) recovering treated sludge solids for disposal whereby the lead-containing sludge is detoxified to acceptable non-hazardous levels of organic lead compounds.

The sludge treatment tank for separating solid and volatile liquid materials includes a horizontal enclosed tank comprising tank support means, a sloped bottom portion and a removable top closure. Optimum separation is achieved with a lower coarse inert particle bed covering the sloped bottom portion and liquid drain means for receiving liquid through the coarse particle bed, an upper finer inert particle bed extending horizontally over the lower coarse particle bed, and porous screen separator means disposed between said upper and lower bed for supporting said finer particle bed. Flame arrestor vent means mounted above the upper bed permits controlled venting of volatile materials from the enclosed tank under hydrocarbon conservation conditions, and upper inlet means may be provided for introducing sludge into the treatment tank above the upper bed. The removable top permits natural sunlight U-V irradiation of deliquified sludge contained on the upper bed. Air inlet ports disposed on the tank sides provide flow control.

Sludges removed from the bottom of storage tanks which have contained leaded gasoline may be detoxified by draining and evaporating flammable hydrocarbon and associated organic lead antiknock compounds, such as tetraethyl lead.

Advantageously, the vertical sides of the treatment tank have closable air vent means to permit circulation of ambient air through the upper portion of the tank following the liquid drainage.

These and other features of the invention can be seen in the following detailed description and in the drawing.

THE DRAWINGS

DESCRIPTION OF PREFERRED EMBODIMENTS

In the following description metric units, parts by weight and U.S. Resource Conservation and Recovery Act (RCRA) standards are employed unless otherwise stated.

Figure 1:
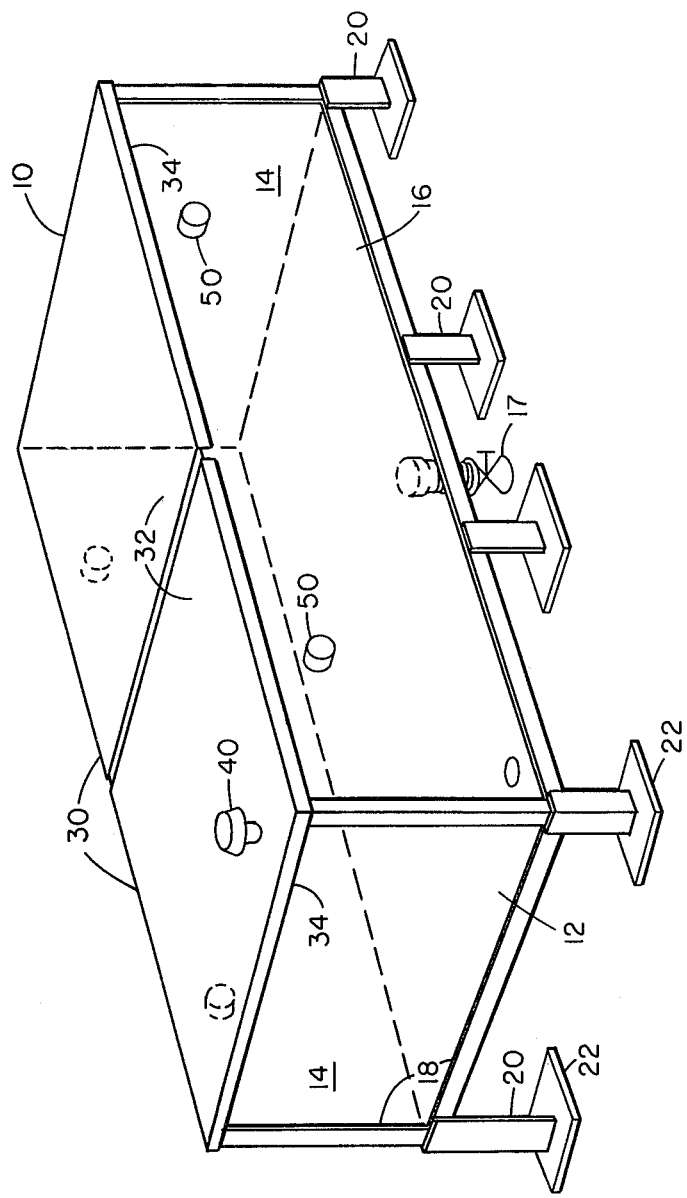
FIG. 1 is an isometric three-dimensional drawing of a preferred tank structure.

Referring to FIG. 1, a treatment tank 10 is shown by isometric representation. The design depicted is a mild steel (10 ga.) sludge treatment tank for separating solid and volatile liquid materials such as gasoline storage tank sludge. The generally rectilinear horizontal bottom shell portion 12 includes vertical sides 14 and a sloped bottom portion 16. The corners of the bottom shell may be reinforced with welded angles 18. The tank support means includes a plurality of welded metal corner extension legs 20 disposed at each of the four corners and at intermediate points on the longest edges. Metal base plates 22 distribute the weight of the tank on a horizontal surface, such as a concrete pad or firm ground.

A removable 2-piece top closure 30 of light sheet steel, fiber glass-reinforced polymer or the like is fitted over the upper edges of the treatment tank to enclose the treatment area. A suitable hydrocarbon conservation flame arrestor vent means 40 is mounted on the tank top 30 above the tank filter bed (not shown) to permit volatile hydrocarbons and water to escape safely from the enclosed tank without explosion hazard. Multiple air vents 50 may be disposed at spaced apart locations around the upper periphery of the tank to permit circulation of air through the tank during treatment. These may be cylindrical ports having removable pipe screw caps to permit ingress and egress of fluids.

Sludge may be introduced to the upper portion of the treatment tank through conduits attached to the tank or simply by removing the top closure covers 30 and pumping sludge over the sides.

Figure 2:
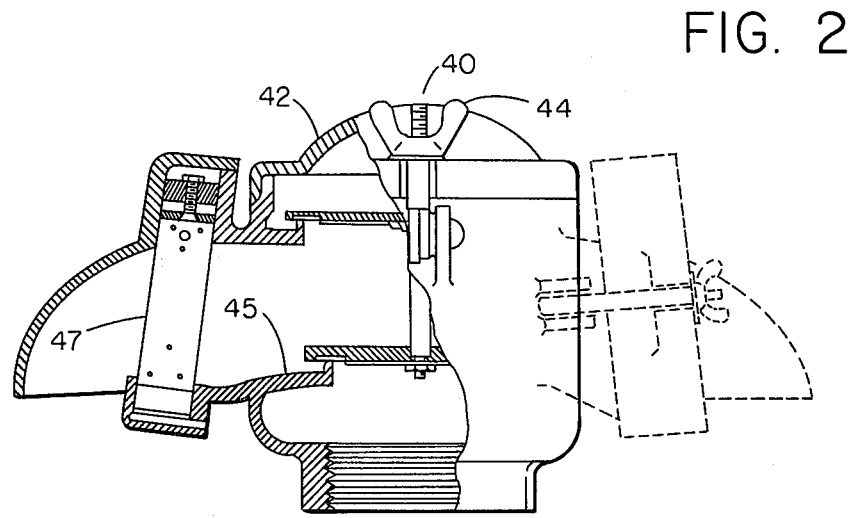
FIG. 2 is a detailed cross-sectioned view of a vent and flame arrestor device.

A suitable flame arrestor 40, such as "Protectoseal Series 830" combination conservation vent and flame arrestor may be employed with the tank for safety purposes. In FIG. 2 a typical flame arrestor vent 40 is shown in vertical cross-section view. A pivotal cover 42 is attached by swing bolts 44. The lower housing portion 45 is attached to the tank by threaded connection or the like. A pressure pallet and flame arrestor grid element 47 cooperate to suppress possible explosions.

The removable 2-piece top 30 may be in any suitable configuration. A preferred shape comprising a flat top portion 32 is held on the tank by a flanged edge portion 34.

Figure 3:
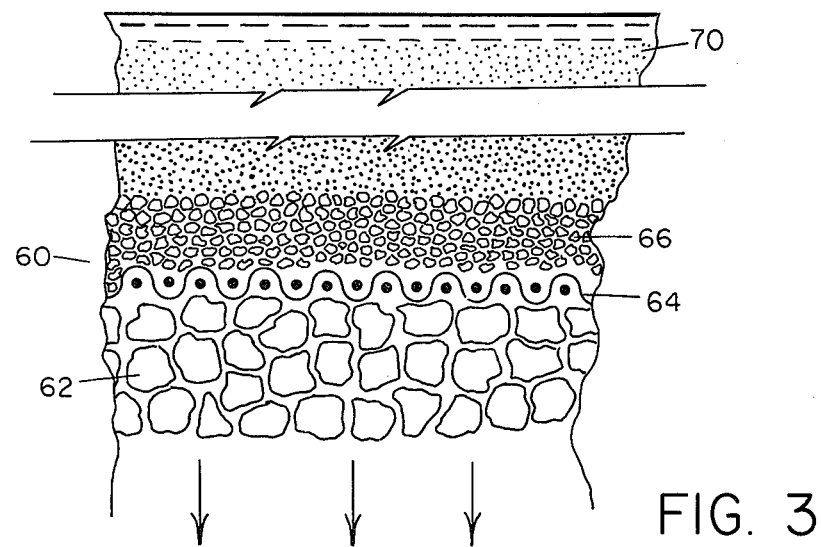
FIG. 3 is a schematic representation in partial vertical cross-section of a typical filter particle bed.

The bottom portion 16 of tank 10 is sloped downwardly toward a valved drain means 17 for receiving liquid drained through the porous filter bed. In FIG. 3, a detailed fragmental vertical view of a typical filter bed 60 is shown. A lower bed 62 of coarse inert particles covers the sloped tank bottom 16 to a depth adequate to ensure even bed support. A substantially level porous screen separator means, such as polypropylene cloth 64, is disposed between the lower bed 62 and an upper bed 66 of finer inert particles. Coarse pea gravel having an average particle size of about 1 cm. is the preferred coarse particle material, and sand ($SiO_2$) having a particle size of about 10 to 5000 microns is the preferred fine-particle material.

The screen separator provides means for supporting the fiber particles in position to filter the sludge particles without substantial loss of the finer particles through the screen, thus preventing clogging of the lower bed and enhancing filtration characteristics.

For a typical petroleum refinery gasoline storage tank sludge treatment, a tank having estimated capacity of about 15,000 pounds is designed having 60×120 inches horizontal dimensions and 42 inches minimum depth with 6 inches bottom pitch (12:1 slope).

Figure 4:
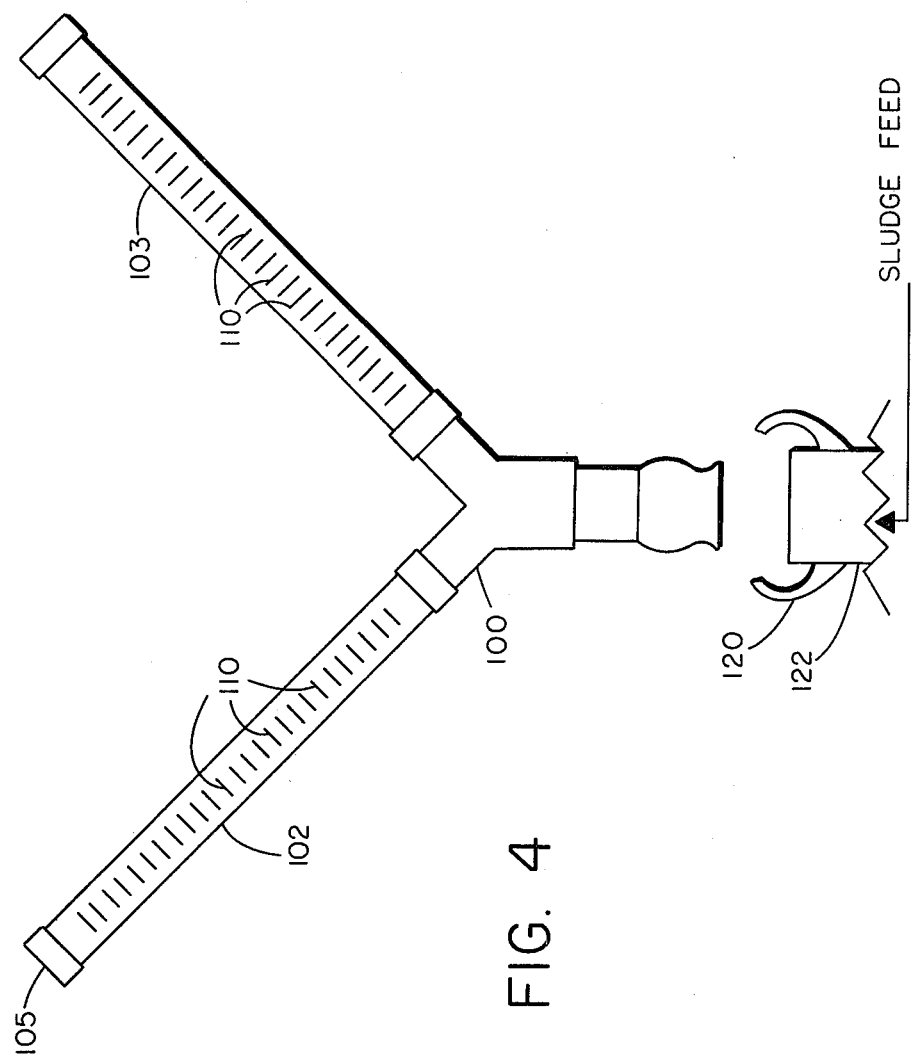
FIG. 4 is a bottom view of a sludge distributor device.

A pumpable sludge containing, for example, 25 to 75 Wt.% solids plus free water and gasoline liquids may be applied evenly through the open top tank by connecting a hose-type conduit to the sludge container and pumping the material into the treatment tank through a distributor as shown in FIG. 4. A standard PVC plastic Y is fitted with two rigid plastic pipes 102, 103, each having end caps 105 and a series of lateral slots measuring about 5 mm×4 cm. Mating quick-clamp connectors 120, 122 attach the device to sludge hose conduit. Alternatively, the sludge may be pumped slowly into the tank through inlet ports 50 (FIG. 1).

EXAMPLE 1

To demonstrate the use of the system a typical leaded gasoline storage sludge is collected from the bottom of a large storage tank during cleaning operations. The viscous sludge is a pumpable multi-phase material containing 53 wt.% solids, 45% free water and 2% free gasoline hydrocarbons. The lead content is 16.7 mg/l (RCRA Extraction Procedure Pb toxicity classification-hazardous). The ASTM D56 flash point is ambient temperature (20°–25° C.). The sludge is applied evenly over the tank filter bed to a depth of about 15 cm (6 inches) and the tank cover is secured. The free liquid, including water and gasoline, are allowed to drain through the filter medium for 24 hours and are collected via the leachate drain. Air is then circulated through the inlet ports at ambient temperature for one week during which time the residual water and gasoline are evaporated, leaving wet solids which are ignitable at ambient. However, the organic lead content is 1.9 mg/l and rated as non-hazardous. The tank top is then removed to permit photodegradation under ambient light in open air. After three weeks the organic lead is reduced to 1.2 mg/l and flash point is above 65° C. At this point the treated sludge is still rated non-hazardous E.P. Toxicity (U.S. Environmental Protection Agency Test Method, 1980). The E.P. Toxicity lead content is further reduced to 0.9 mg/l at 5 weeks.

EXAMPLE 2

The procedure of Example 1 is followed except the sludge contains 49 wt.% solids, 35% free water, 16% free gasoline, and contains 27.5 mg/l Pb (RCRA E.P. Toxicity lead). Following one week of draining, the sludge solids content increases to 67%, with 18% free water 15% free gasoline, and 26.7 mg/l Pb (flash pt. 25° C.). The closed tank treatment is continued for the third week to obtain 90% solids, 10% free gasoline and 21.5 mg/l Pb. Air circulation is started at this point and after the fifth week 100% wet solids are obtained, with 0.3 mg/l Pb by weathering; however, the material is still rated as hazardous to the low flash point (28° C.). Further photodegradation and weather exposure reduces the toxic lead content to 0.1 mg/l and complete evaporation of the volatile hydrocarbon raises the flash point above 90° C., rendering the treated material non-hazardous at the end of several weeks of total treatment time.

Typically, the technique is applied using one part sludge per part by weight of sand filter medium and equal amount of gravel substrate, observing a maximum thickness of about 10–20 cm sludge. As the deliquified filter cake undergoes treatment, the caked solids can form fissures during the drying process. During the weathering phase of treatment, exposed solids may be naturally U-V irradiated through the cracks in the caked layer. Ground water pollution is avoided by draining the free hydrocarbon liquids and contaminated water into a primary water treatment system. Water washings from tank cleaning can also be added directly to the sludge as part of an overall maintenance operation.

Treated dry sludge solids are easily removed as a cracked cake by shovel or other suitable scraping implement to expose the top filter medium. A thin layer of sand may be contaminated by the sludge, requiring periodic removal and replacement to regenerate the apparatus.

While the invention has been described by specific embodiments, there is not intent to limit the inventive concept except as set forth in the following claims.

We claim:

1. A method for treating lead-containing sludge from liquid petroleum product storage sites comprising the sequential steps of
   (a) transporting a solid-liquid lead-containing sludge mixture containing volatile liquid hydrocarbons, sludge solids and water to an enclosed outdoor filter tank having a removable top cover;
   (b) applying the sludge mixture uniformly over a horizontal bed of supported inert filter particles;
   (c) draining liquid from the sludge mixture through the filter particles to deposit a layer of wet sludge solids onto the filter particles;
   (d) permitting residual sludge liquids to evaporate in the filter tank by introducing controlled airflow and withdrawing hydrocarbon vapors through a flame arrestor outlet vent;
   (e) removing the top cover to expose sludge solids to ambient ultraviolet radiation and weathering conditions for photo-degradation of the sludge solids; and
   (f) recovering treated sludge solids for disposal.

2. The method of claim 1 wherein the lead-containing sludge is detoxified in situ to acceptable non-hazardous levels of organic lead compounds.

3. The method of claim 1 wherein the bed of filter particles comprises a lower coarse particle bed, an upper finer particle bed extending horizontally over the lower coarse particle bed, and a porous screen separator disposed between the upper and lower beds.

4. The method of claim 1 wherein lead-containing sludge is detoxified in situ to acceptable non-hazardous levels of organic lead compounds.

5. A method of treating sludge from liquid petroleum product storage sites comprising the sequential steps of
   (a) transporting a solid-liquid sludge mixture containing volatile liquid hydrocarbons, sludge solids and water to an enclosed outdoor filter tank having a sloped bottom portion and a removable top closure, a lower coarse inert particle bed covering the sloped bottom portion, a liquid drain for receiving liquid through the coarse particle bed, an upper fine inert particle bed extending horizontally over the lower coarse particle bed, a porous screen separator disposed between said upper and lower beds for supporting said finer particle bed; and a flame arrestor vent mounted above the upper bed for permitting controlled venting of volatile materials from the enclosed tank under hydrocarbon conservation conditions;
   (b) applying the sludge mixture uniformly over the filter particles;
   (c) draining liquid from the sludge mixture through the filter particles to deposit a layer of wet sludge solids onto the filter particles;
   (d) permitting residual sludge liquids to evaporate in the filter tank by introducing controlled airflow and withdrawing hydrocarbon vapors through the flame arrestor outlet vent;
   (e) removing the top cover to expose sludge solids to ambient ultraviolet radiation and weathering conditions for photo-degration of the sludge solids; and
   (f) recovering treated sludge solids for disposal.

* * * * *